July 21, 1964 R. McGAVIN GARLAND ETAL 3,141,572
APPARATUS FOR DISPENSING PRESELECTED MIXTURES OF LIQUIDS
Filed Oct. 10, 1961 2 Sheets-Sheet 1
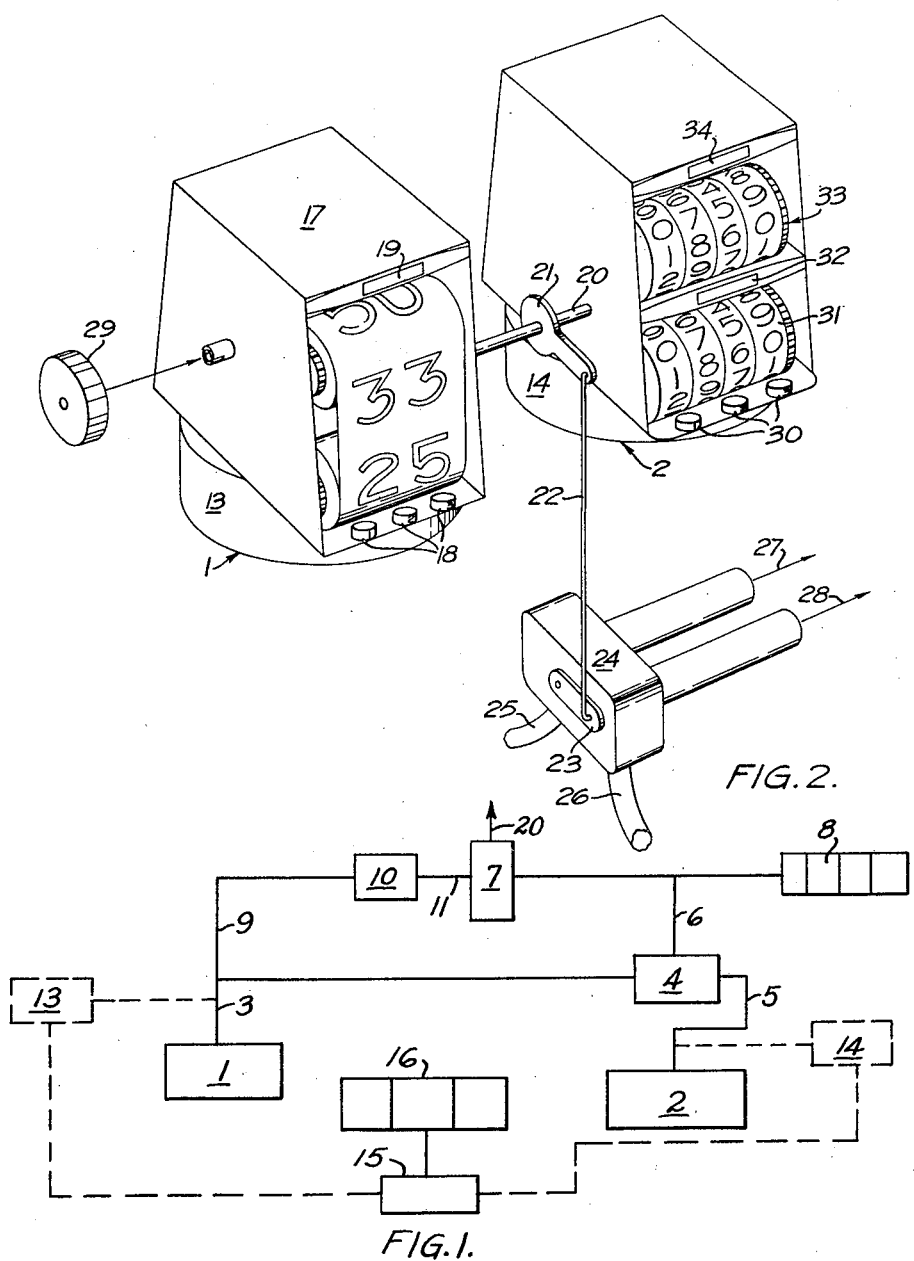

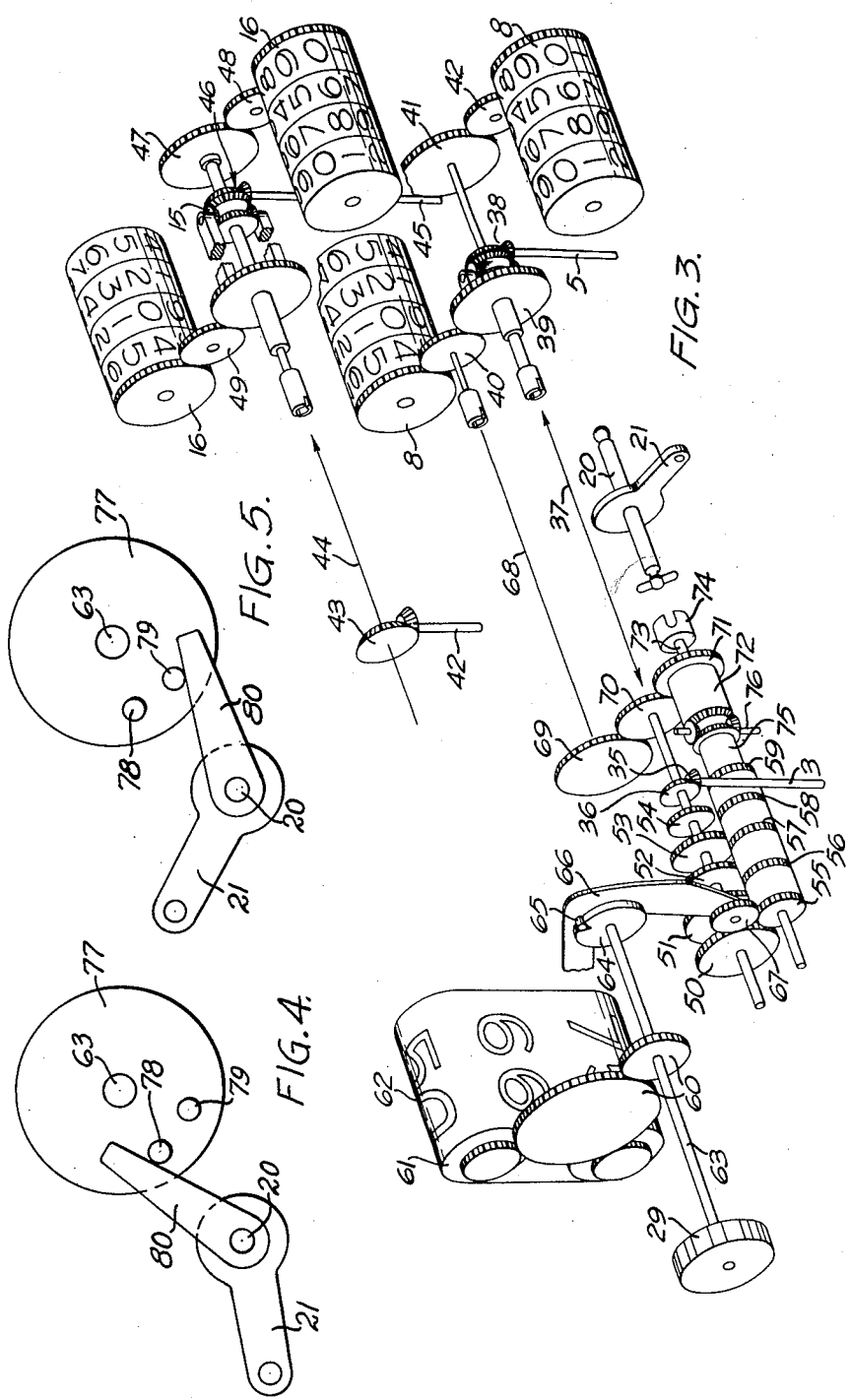

United States Patent Office 3,141,572
Patented July 21, 1964

3,141,572
APPARATUS FOR DISPENSING PRESELECTED MIXTURES OF LIQUIDS
Ronald McGavin Garland, Ham Common, near Richmond, and Ernest Stanley Ashford, Oxted, England, assignors, by mesne assignments, to Veeder-Root Incorporated, Hartford, Conn., a corporation of Connecticut
Filed Oct. 10, 1961, Ser. No. 144,261
Claims priority, application Great Britain Oct. 12, 1960
8 Claims. (Cl. 222—28)

This invention relates to apparatus for dispensing preselected mixtures of liquids and concerns more particularly apparatus for dispensing different mixtures of two liquids such, for example, as petrols of different grades or octane ratings.

In a known type of such apparatus there are provided separate flow lines for the liquids, each line having a pump, an adjustable control valve and a flow meter having an output shaft, and a common discharge nozzle for the pipe lines. Also such apparatus has included a total cost indicator, a total quantity indicator and two differential mechanisms, the output shaft of one, driven by the output shafts of the meters, driving the total cost indicator, whilst the output shaft of the second, also driven by the output shafts of the meters, drives the total quantity indicator, so that the total cost and quantity of the mixed liquids dispensed is indicated.

In such known type of apparatus the output shaft of each meter is coupled to a valve which are coupled together so as to control the proportions of the two liquids delivered as a mix to the discharge nozzle. Such an arrangement is not altogether satisfactory since the accuracy of the proportions of the two liquids in the mix dispensed is dependent on the accuracy of the calibration and presetting of the valves; furthermore should there exist, through an unforeseen cause, any restriction or impediment to the flow of liquid to the valve, the valves will remain at the preselected position for delivering the desired proportions of liquids and thus an incorrect mix would be delivered.

To overcome the above disadvantages, it has been proposed to connect the output of each meter through a gear-box to the mix control valve differential mechanism, the gears of said boxes being selected so as to obtain identical speeds of drive to each side of said differential. Such an arrangement gives greater accuracy of control but provides a somewhat complicated and expensive device.

According to the present invention, apparatus of the type described for dispensing different mixtures of two liquids comprises a summing differential in which the output speeds of the two meters are added, a control valve differential mechanism for actuating the valves controlling flow of liquid to the discharge nozzle, the output shaft of the summing differential driving one side of the control valve differential mechanism, the other side of which is driven through a single gear-box actuated solely by the output shaft of one of the meters.

Preferably a "mix" control knob is provided for preselecting the gear in said gear-box desirable for providing the desired mix.

In such an arrangement the control of the valve mechanism for allowing delivery of liquid is thus directly responsive to the output speed of the summing differential or mix.

One form of apparatus, according to this invention, for dispensing different mixtures of petrols of different octane ratings is diagrammatically illustrated in the accompanying drawings in which:

FIGURE 1 is a flow system diagram, the pumps, valve mechanism and common discharge line being omitted;

FIGURE 2 is a perspective view of the main portions of the dispensing apparatus, whilst FIGURE 3 is an exploded perspective view; and FIGURES 4 and 5 are diagrammatic detail views.

Referring to FIGURE 1, the apparatus comprises a "Low" and a "High" octane rating liquid meter 1, 2 respectively. The output shaft 3 of the "Low" meter 1 is led to one side of a summing differential 4 whilst the output shaft 5 of the "High" meter 2 is led to the other side of said differential 4, the output shaft 6 of which drives one side of a valve control differential mechanism 7 and also a "mix" quantity indicator 8. The output shaft 3 has a branch 9 which drives a gear-box 10 the drive shaft 11 of which is coupled to the opposite side of the control valve differential mechanism 7, the output shaft 20 of which operates the valves 24 (shown in FIG. 2) controlling the flow of liquid to a single delivery nozzle. 13 and 14 represent cash variators of known construction coupled through a cash summing differential 15 actuating a total cash indicator 16.

Referring now to FIGURES 2 and 3, the same parts as shown in FIGURE 1 are indicated by the same reference numerals; thus 1 and 2 are the "Low" and "High" meters respectively, which drive a computer consisting basically of two units. The unit driven by the output shaft 3 of the meter 1 comprises a variator 13 of standard construction on which is mounted a dummy counter section 17 in which is assembled the valve control mechanism shown in FIGURE 3. Price indicating wheels 18 are provided which are adjusted in their indication according to the setting of the variator 13. A totaliser 19 shows the quantity of "Low" which is passed through the apparatus. A shaft 20 coupled between the dummy counter 17 and another counter of the second unit and to be described below, carries a lever 21 which is coupled by a link 22 to a lever 23 which controls operation of a mixing valve device 24 so constructed that movement of the lever 23 in one or other direction provides more or less of the "Low" petrol supplied through a pipe 25 and less or more of the "High" petrol supplied through a pipe 26. Two pipes 27, 28 carry the "Low" and "High" petrols to a delivery nozzle in which the petrols are mixed to the blend required.

A blend control knob 29 mounted on the main apparatus housing is utilised to adjust the valve control mechanism to vary the blend as required, and as will be described in greater detail below.

The second unit driven by the meter 2 indicates the price e.g. per gallon of the "High" petrol on figure wheels 30. The total quantity of Mix is indicated on the figure wheels 31 and a totaliser 32 indicates the running quantity total of the Mix supplied. Four wheels 33 show the cash value of a particular delivery and a totaliser 34 shows the total cash value of all Mix deliveries.

The counter section of said second unit receives the quantity drives from both meters 1 and 2 and the cash driven from the variators 13, 14 (FIGURE 1).

The quantity drive is received through the output shaft 3 (see more particularly FIGURE 3), which drives through bevels 35 a cross-shaft 36 and through a coupling 37 to one side of the summing differential 4 (FIGURE 1). The output shaft 5 of meter 2 drives through bevels 38 to the outer side of the differential 4. A gear 39, forming part of the differential 4, carries the differential cage and rotates freely therewith. It will thus be seen that the drives from the meters 1, 2 are accumulated and rotation of the gear 39 is directly proportional to the quantity of Mix being delivered. The gear 39 drives a gear 40 and therethrough one set of quantity figure wheels 8; said gear 39 also drives a further gear 41 and through an idler 42 the other set of quantity figure wheels 8. The number of teeth on the gears and bevels concerned is so adjusted as to give the correct quantity indication on the two sets of wheels 8 which thus indicate the quantity of Mix being dispensed.

Similarly the cash indication is received from the variator 13 through a shaft 42, bevels 43, coupling 44 to the differential 15 (FIGURE 1) shown in FIGURE 3 partly exploded. This differential 15 is also driven from the variator 14 through a shaft 45 and bevels 46. In a similar manner two sets of figure wheels 16 are driven by gears 47, 48, 49 from the output of the differential 15 to indicate the cash value of any quantity of Mix delivered. It will be appreciated that the sets of figure wheels 8 and 16 are of course normally reset in known manner to zero after each delivery.

Attached to the lever 21 is the valve control differential mechanism 7 (FIGURE 1), the purpose of which is to cause the cage of the differential to move the lever 21 in such a direction as to compensate for any variation from the preselected Mix which may take place during delivery.

The output from "Low" quantity drive is fed by the branch 9 to the gear-box 10 which includes five gear wheels 50, 51, 52, 53, 54. The Mix quantity drive is fed to the right hand side of the differential 7.

The gear-box includes a further set of gear wheels 55, 56, 57, 58 and 59.

For the full functioning of the dispensing apparatus, other known devices, not shown in the drawings, are required such as interlocking device to prevent the blend from being changed whilst the pumps are in operation and to prevent the pumps being switched on if the blend control knob has not been set in the correct position for a desired blend. Means are also provided whereby, when the lever 23 is locked at one or other end of its travel, 100% "Low" or 100% "High" petrol is delivered.

When it is desired to balance the differential 7, it is essential to drive the left hand side of said differential at an equal and opposite speed to that of the right hand side and this is obtained by selecting a suitable ratio of gears to raise the speed of the "Low" quantity drive up to that of the Mix.

As will be seen more particularly from FIGURE 3, the blend control knob 29 drives, through suitable gearing 60, a drum 61 to rotate a figure band 62 to indicate the particular blend being supplied. Rotation of the knob 29 also, through a shaft 63, rotates a series of cams 64 (only one of which is known) in each of which is a notch into which a pin 65 on a lever 66 can drop so as to cause its lever 66 to move downwardly, when a desired setting of the knob 29 has been achieved. It will be appreciated that there are five levers 66 each of which carries at its lowermost extremity an idler gear 67. The idler 67 transmits the drive from one of the gears 50–54 to its corresponding gear 55–59 in the gear-box.

As stated above, the shaft 3 drives the bevels 35 and the shaft 36, which carries the gears 50–54, at a speed directly proportional to the quantity of "Low." The gear 40 also drives through a coupling 68 a gear 69 at a speed proportional to that of the Mix. This gear 69 drives, through an idler 70, mounted for sake of convenience on the shaft 37 and rotatable separately therefrom, a gear 71 on the hub of which is a bevel 72.

It will thus be seen that the single gear-box comprises the sets of gears 50–54 and 55–59, the associated cam 64 and lever 66, a desired gear being selected by actuation of the knob 29.

Rotating with the gears 55–59 but freely running on the shaft 73 which carries a coupling 74 is a bevel 75 which forms one side of the differential 7, the other side being formed by the bevel 72. A further pair of bevels 76 are mounted in the differential cage (not shown) which is secured to the shaft 73. The other part of the coupling 74 carries the lever 21 supported between the two counter units (see FIGURE 2).

The gear 50 is used as part of the drive when 75% of the Mix is "Low." This gear should therefore run at three-quarters of the speed of the Mix and by driving from the gear 50 to the gear 55 through an idler 67 (the gear ratios being 4:3) the speed of the "Low" is raised to that of the Mix. Similarly for 66⅔% "Low," the speed has to be raised 3:2, for 50% by 2:1, for 33⅓% by 3:1 and for 25% by 4:1. The sets of gears 50–54 and 55–59 are selected accordingly.

The two sets of gears 50–54 and 55–59 thus enable the dispensing apparatus to dispense five different Mixes and either 100% "Low" or 100% "High," the Mixes being respectively 75% "Low" and 25% "High," 66⅔% "Low" and 33⅓% "High," 50% "Low" and 50% "High," 33⅓% "Low" and 66⅔% "High," and 25% "Low" and 75% "High."

In order to obtain delivery of a desired blend, the knob 29 is rotated and through the appropriate cam 64 causes the particular lever 66 to move downwardly and impart the necessary drive in the gear-box. The "Low" drive comes from the meter 1 through the shaft 3 to the bevel 75, whilst the Mix drive comes from the gear 40 through the coupling 68, gear 69, idler 70 to the bevel 72. The gear-box is so designed that the bevel 75 rotates in the opposite direction to that of the bevel 72 and theoretically at the same speed. If, however, through any unforeseen cause, the meter 1 runs e.g. faster thus giving an incorrect blend, the cage bevels 76 rotate in such a direction as to move the lever 21 so as to shut down the supply of petrol momentarily to the meter 1 until balance is once more achieved.

As has been stated above, means can be provided whereby 100% "Low" or 100% "High" petrol is delivered and in these circumstances it is preferred to provide means for locking the lever 23 at one or other end of its travel. Such an arrangement is shown in FIGURES 4 and 5. As will be seen therefrom the shaft 63 carries a disc 77 on which are fixed two pins 78, 79 which provide stops for rotational movement of a 100% lever 80 carried by the shaft 20 on which the lever 21 is also carried.

When the "mix" or blend control knob 29 is rotated by an operator to one end of its travel e.g. to obtain delivery of 100% "Low" petrol, rotation of the shaft 20 moves the lever 21 to one end of its travel and at the same time moves the lever 80 until it abuts the pin stop 78 (see FIGURE 4) thereby preventing further rotation in the same direction of the shaft 20.

Similarly when 100% "High" petrol is to be delivered, actuation of the knob 29 brings the lever 80 into abutting engagement with the pin stop 79.

Although when describing the construction shown in the drawings reference is made to mixing petrols of different octane ratings, it will of course be obvious that the dispensing apparatus can equally be used for mixing petrol and oil or any other liquids.

What we claim is:

1. In apparatus for dispensing mixtures of two liquids of the type having two flow lines, a flow meter in each line, and a valve mechanism for varying the proportion of liquid flow in the lines comprising valve means in each line coupled together for simultaneous movement, the combination comprising a summing differential connected to both meters and having an output shaft rotated in accordance with the combined output of the meters, a single variable gear box driven solely by one of the meters, and a control valve differential mechanism having its output connected to the valve mechanism for actuating the same and having one input means connected to the output shaft of the summing differential and having its other input means driven by the gear box.

2. The combination set forth in claim 1, a rotatable control shaft connected to the variable gear box for varying the setting thereof, a control knob attached to the shaft, a drum geared to the shaft, and a figure band carried by the drum having indicia for indicating the blend being dispensed.

3. The combination set forth in claim 1 wherein the gear box comprises two sets of coaxial gears fixed on parallel shafts, one shaft being connected to said other input means of the control valve differential mechanism and the other shaft being connected to said one of the meters, a plurality of idler gears movable selectively into and out of engaging position for forming a driving connection between one gear of one of the sets of coaxial gears and one gear of the other set of coaxial gears, and cam means on said rotatable control shaft for selectively moving one of the idler gears into engaging position.

4. The combination set forth in claim 3 wherein each of the idler gears is supported on a pivotally mounted arm and the rotatable control shaft is provided with a plurality of cams, one for each arm, for controlling the pivoted position thereof in accordance with the rotated position of the shaft.

5. The combination set forth in claim 4 wherein a rotary indicator is coupled to the control shaft for movement therewith and includes indicia identifying the blend being dispensed.

6. The combination set forth in claim 3 wherein said cam means is operable in at least one rotated position of the control shaft to disengage all of the idler gears, and stop means is provided for limiting movement of the output of the control valve differential mechanism.

7. The combination set forth in claim 1 wherein a pair of counter housings are mounted in side-by-side relationship, one housing containing a register connected to the summing differential for registering the quantity of liquid dispensed and the other counter housing containing the control valve differential mechanism, the gear box, and an indicator showing the setting of the gear box.

8. The combination set forth in claim 7 wherein the output of the control valve differential mechanism is connected to a shaft extending between the housings, and a lever is fixed to said shaft intermediate the housings for connection to the valve mechanism.

References Cited in the file of this patent

UNITED STATES PATENTS 2,931,538    Young et al. _____ Apr. 5, 1960